US 9,532,356 B2

(12) United States Patent
Skov et al.

(10) Patent No.: US 9,532,356 B2
(45) Date of Patent: *Dec. 27, 2016

(54) COMPONENT CARRIER CONFIGURATION

(71) Applicant: Nokia Solutions and Networks Oy, Espoo (FI)

(72) Inventors: Peter Skov, Beijing (CN); Esa Tapani Tiirola, Kempele (FI); Peng Chen, Beijing (CN); Chun Yan Gao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,985

(22) Filed: Oct. 8, 2015

(65) Prior Publication Data

US 2016/0073401 A1 Mar. 10, 2016

Related U.S. Application Data

(63) Continuation of application No. 13/639,384, filed as application No. PCT/EP2010/054665 on Apr. 8, 2010, now Pat. No. 9,198,178.

(51) Int. Cl.
  H04J 1/00 (2006.01)
  H04W 72/04 (2009.01)
  H04L 5/00 (2006.01)
  H04L 5/14 (2006.01)

(52) U.S. Cl.
  CPC .......... *H04W 72/0446* (2013.01); *H04L 5/001* (2013.01); *H04L 5/0007* (2013.01); *H04L 5/0055* (2013.01); *H04L 5/0078* (2013.01); *H04L 5/1469* (2013.01); *H04W 72/044* (2013.01); *H04L 5/0053* (2013.01)

(58) Field of Classification Search
  CPC .... H04L 5/0005; H04L 5/001; H04W 72/0446
  See application file for complete search history.

(56) References Cited

U.S. PATENT DOCUMENTS

| 9,198,178 B2 * | 11/2015 | Skov et al. |
| 2007/0081489 A1 * | 4/2007 | Anderson ............. H04W 16/14 370/329 |
| 2008/0220787 A1 | 9/2008 | Stanwood et al. ............ 455/450 |

(Continued)

FOREIGN PATENT DOCUMENTS

| CN | 101646234 A | 2/2010 |
| EP | 2408247 A1 | 1/2012 |
| WO | WO 2010/151213 A1 | 12/2010 |

OTHER PUBLICATIONS

3GPP TS 36.211 V9.1.0 (Mar. 2010), "$3^{rd}$ Generation Partnership Project; Technical Specification Group Radio Access Network; Evolved Universal Terrestrial Radio Access (E-UTRA); Physical Channels and Modulation (Release 9)", 85 pgs.

*Primary Examiner* — Kevin C Harper
(74) *Attorney, Agent, or Firm* — Harrington & Smith

(57) ABSTRACT

A method of configuring a component carrier includes determining how timings of receiving and/or sending data for at least two aggregated component carriers in at least one time period are related; and setting the timing of receiving and/or sending data for the at least two aggregated component carriers based on the determining.

29 Claims, 7 Drawing Sheets

(56) References Cited

U.S. PATENT DOCUMENTS

| | | | |
|---|---|---|---|
| 2009/0323613 A1 | 12/2009 | Frederiksen et al. | 370/329 |
| 2011/0176435 A1 | 7/2011 | Khandekar et al. | 370/252 |
| 2011/0261714 A1 | 10/2011 | Pan | 370/252 |
| 2012/0099577 A1 | 4/2012 | Baldemair et al. | 370/338 |

* cited by examiner

COMPONENT CARRIER CONFIGURATION

CROSS-REFERENCE TO RELATED APPLICATIONS

The present application is a continuation of U.S. patent application Ser. No. 13/639,384, filed on Jan. 28, 2013, which claims benefit of P.C.T. application (WO 2011/124259), filed Apr. 8, 2010, the disclosure of which is incorporated by reference herein in its entirety.

The invention relates to carrier aggregation and in particular to configuration of aggregated component carriers.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

Carrier aggregation can be used to increase performance, especially for example, for peak data rate. In carrier aggregation a plurality of carriers are aggregated to increase bandwidth. Carrier aggregation comprises aggregating a plurality of component carriers into a carrier that is referred to in this specification as aggregated carrier.

The communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of attempts to solve the problems associated with the increased demands for capacity is an architecture that is known as the long-term evolution (i) of the Universal Mobile Telecommunications System (UMTS) radio-access technology. The LTE is being standardized by the 3$^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator. A further development of the LTE is referred to as LTE-Advanced (LTE-A). The LTE-Advanced aims to provide further enhanced services by means of even higher data rates and lower latency with reduced cost.

A feature of the LTE-Advanced is that it is capable of providing carrier aggregation. In LTE-A two or more component carriers (CCs) can be aggregated in order to support wider transmission bandwidths, such as up to 100 MHz, and/or for spectrum aggregation. It is possible to configure a user equipment (UE) to aggregate a different number of component carriers connected with the same base station, for example a LTE eNode B (eNB), and of possibly different number of component carriers (aggregated bandwidth) in the uplink (UL) and the downlink (DL).

In a time division duplex (TDD) system, it is possible to provide specific TDD configurations for each aggregated component carrier. A problem that may occur in specific time division duplex configurations for each component carrier is that a communication device may be subject to self-interference. Furthermore, hybrid automatic repeat requests timing may be different for different TDD configurations which can make carrier aggregation difficult.

Embodiments of the invention aim to address one or several of the above issues.

In accordance with an embodiment there is provided a method comprising: determining how timings of receiving and/or sending data for at least two aggregated component carriers in at least one time period are related; and setting the timing of receiving and/or sending data for the at least two aggregated component carriers based on the determining.

Preferably the setting comprises preventing receiving and/or sending data on one of the at least two aggregated component carriers in the at least one time period if the timings are different.

Preferably the setting comprises allowing receiving and/or sending data on one of the at least two aggregated component carriers in the at least one time period if the timings are the same.

Preferably the at least two aggregated component carriers comprises at least one first component carrier for receiving and/or sending control information.

Preferably the setting comprises preventing receiving and/or sending data in the at least one time period on at least one second component carrier if the timing of receiving and/or sending data of the second component carrier is different from the timing of receiving and/or sending data of the at least one first component carrier.

Preferably the control information is one or more of the following: acknowledgements, negative acknowledgements and scheduling grants.

Preferably the at least two aggregated component carriers comprises a plurality of contiguous or non contiguous component carriers.

Preferably at least one of hybrid automatic repeat request timing and uplink resource allocation timing is based on the timing of the at least one first component carrier.

Preferably the at least one first component carrier comprises at least one downlink carrier and at least one uplink carrier.

Preferably the downlink control information is received and/or sent on the at least one downlink carrier and uplink control information is received and/or sent on the at least one uplink carrier.

Preferably the setting comprises scheduling sending information only on the at least one uplink carrier or on the at least one downlink carrier in the at least one time period.

Preferably the number of downlink carriers is different from the number of uplink carriers.

Preferably the time period is one or more sub frames.

Preferably the sending and/or receiving of data occurs on the same carrier.

In accordance with another embodiment there is provided an apparatus comprising: a processor; memory including computer program code; the memory and the computer program code configured to, with the processor, cause the apparatus to perform at least the following: determine how the timings of receiving and/or sending data for at least two aggregated component carriers in at least one time period are related; and set the timing of receiving and/or sending data for the at least two aggregated component carriers on the basis of the determining.

In accordance with yet another embodiment there is provided an apparatus comprising: determining means for determining how the timings of receiving and/or sending data for at least two aggregated component carriers in at least one time period are related; and setting means for setting the timing for receiving and/or sending data for the at least two aggregated component carriers based on the determining.

Carrier aggregation may be provided in accordance with the specifications by the third generation partnership project (3GPP). In some embodiments there is a base station comprising the apparatus. Preferably the base station is an eNode B.

A computer program comprising program code means adapted to perform the method may also be provided. In accordance with further embodiments apparatus and/or computer program product that can be embodied on a computer readable medium for providing at least one of the above methods is provided.

Various other aspects and further embodiments are also described in the following detailed description and in the attached claims.

The invention will now be described in further detail, by way of example only, with reference to the following examples and accompanying drawings, in which.

In the following description certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
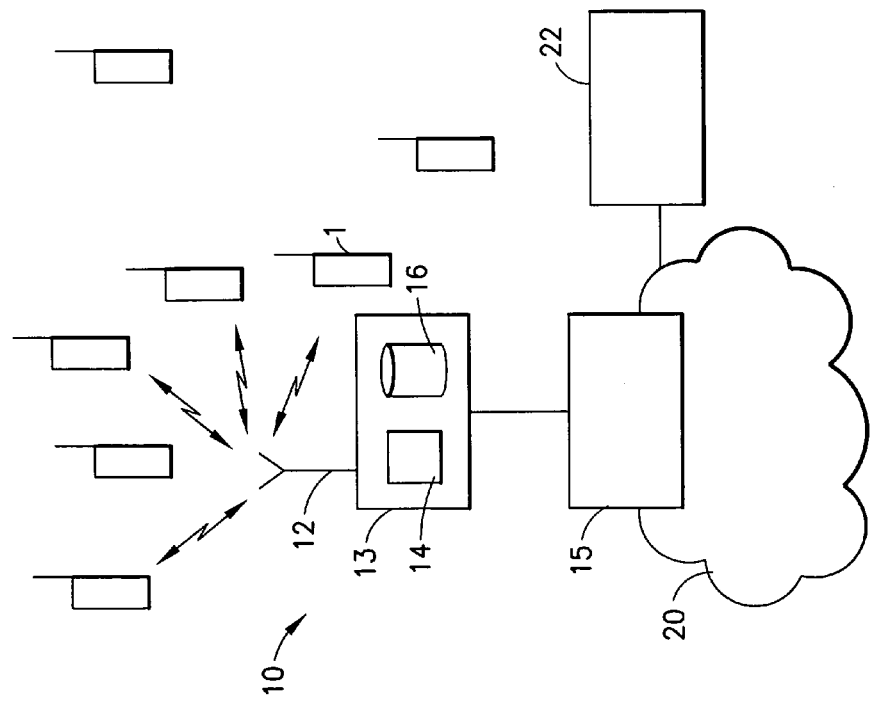
FIG. 1 shows an example of a communication system in which the embodiments of the invention may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory, at least one data processing unit and an input/output interface. The controller may be provided with memory capacity and at least one data processor 14. It shall be understood that the control functions may be distributed between a plurality of controller units. The controller apparatus for e base station may be configured to execute an appropriate software code to provide the control functions as explained below in more detail.

In the example shown in FIG. 1, the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks. In some embodiments the base station node is an eNode B.

A communication device can be used for accessing various services and/or applications. The communication devices can access the communication system based on various access techniques, such as code-division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
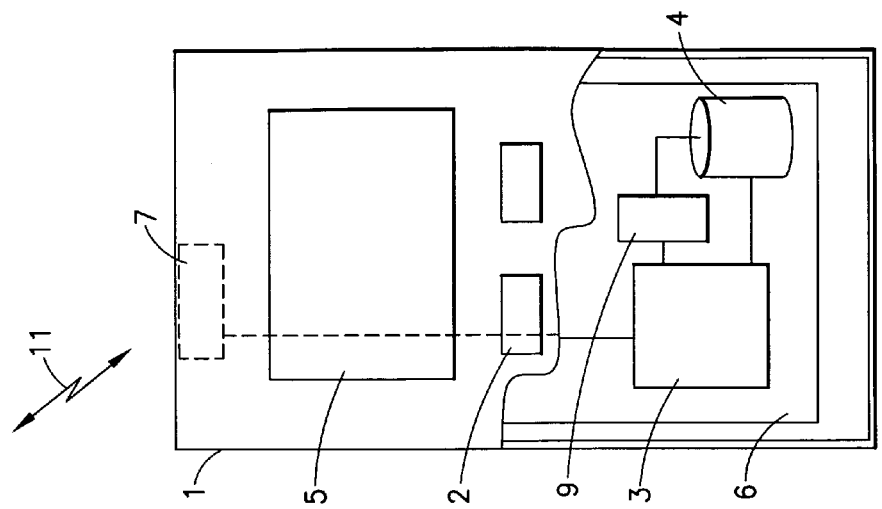
FIG. 2 shows an example of a communication device.

FIG. 2 shows a schematic, partially sectioned view of a communication device 1 that can be used for communication on an aggregated carrier 11 comprising a plurality of component carriers with at least one other wireless station. An appropriate mobile communication device may be provided by any device capable of sending and receiving radio signals. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like.

A mobile communication device may be used for voice and video calls, for accessing service applications provided via a data network. The mobile device 1 may receive signals via appropriate apparatus for receiving and transmitting radio signals on wireless carriers, or radio bearers. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Figure 3:
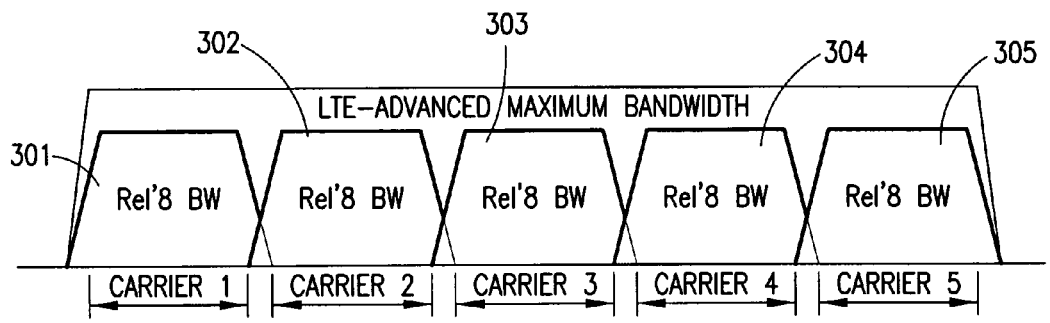
FIG. 3 shows an example of an aggregated carrier.

The principle of carrier aggregation is illustrated in FIG. 3 showing use of five component carriers 301, 302, 303, 304, 305 to form system bandwidth. As explained above, 3GPP LTE Release 8 provides only one carrier and compatible terminals are assumed to be served by a stand-alone component carrier. However, 3GPP LTE-Advanced terminals adapted for operation in accordance with release 10 and upwards can receive and/or transmit simultaneously on multiple aggregated component carriers in the same transmission time interval (TTI). That is, two or more carriers, referred to herein as component carriers can be aggregated such that a communication device may simultaneously communicate one or multiple component carriers depending on its capabilities. It is noted that the component carriers of an aggregated carrier can be provided by different cells.

For example, an LTE-Advanced mobile communication device with reception capability beyond 20 MHz can simultaneously receive on multiple 20 MHz component carriers. In the shown example a plurality of release 8 bandwidth "chunks", or component carriers, are combined together to form M×release 8 bandwidth (BW). If M=5, then the resulting bandwidth is 5×20 MHz=100 MHz.

A particular example will now be discussed with reference to FIGS. 4 and 5.

Figure 4:
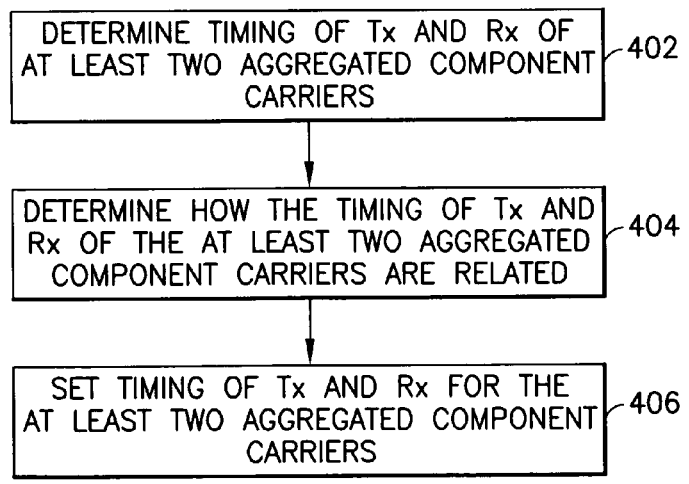
FIG. 4 shows a flow diagram according to some embodiments.

FIG. 4 discloses a schematic flow diagram according to some embodiments. FIG. 5 discloses a signaling diagram between a user equipment or communication device 1 and a base station or eNode B 12 according to some embodiments.

A processor 14 of the controller 13 of the eNode B 12 receives a request for connection from a user equipment 1. The initial access procedure is the same for user equipment not supporting component carrier aggregation. At this stage after initial access there is only one component carrier configured for uplink or downlink communication. In some embodiments the user equipment is any type of communication device. The step of the eNode B 12 receiving the request for connection is shown in the step 502 in FIG. 5.

When the processor 14 receives the request for connection, the processor 14 initiate assigning to the user equipment 1 to the component carriers as shown in step 402 in FIG. 4. In some embodiments the request for connection may be received from the user equipment 1. In some alternative embodiments, the request for connection may be received from an entity on the network side. In some embodiments the processor 14 can determine how timings of receiving and/or sending data for at least two aggregated component carriers in one time period are related. For example, the processor may determine whether the timings of the receiving and/or sending data for the at least two aggregated component carriers are different. The processor 14 may determine the time division duplex configuration for two or more aggregated component carriers.

The processor 14 can determine the time division duplex configuration of plurality of aggregated component carriers by retrieving information from the memory 16. In some embodiments, TDD configuration is a carrier component cell-specific parameter broadcasted as part of system information. The eNode B 12 may store information comprising time division duplex configurations for each component carrier and other scheduling information. The eNode B 12 may retrieve this scheduling information from a memory store within the eNode B 12 or alternatively the eNode B may receive scheduling information from another entity (not shown).

In some embodiments the scheduling information comprises information of the particular timing when data is sent or received by the user equipment when using one or more carrier components.

Figure 8:
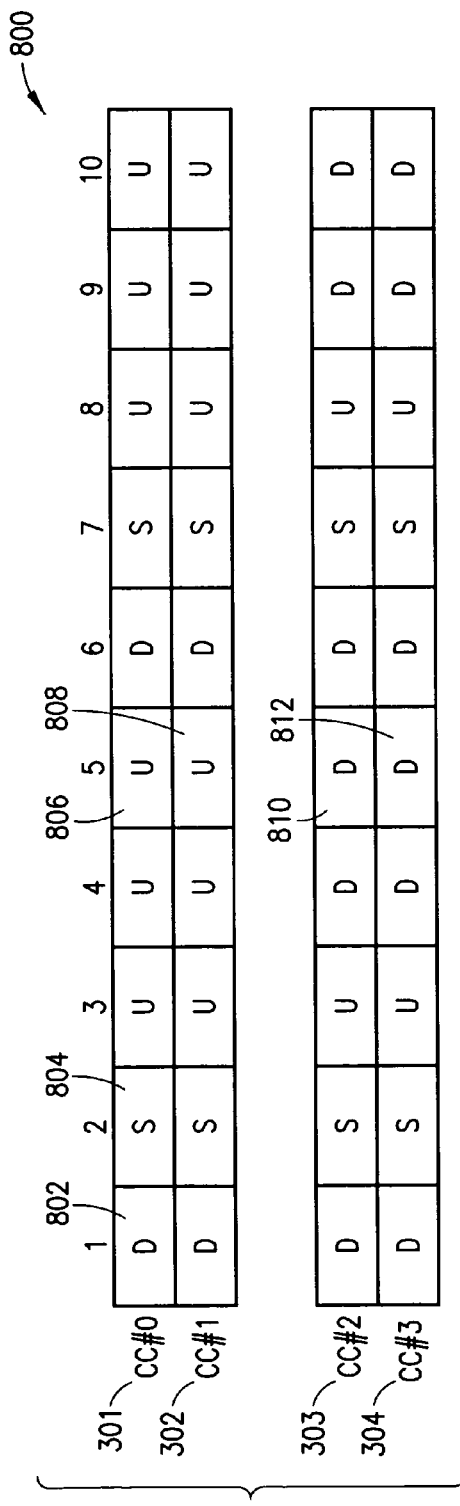
FIGS. 8 to 11 show time division duplex configurations of carriers according to some embodiments.

The scheduling information and time division duplex configurations for the component carriers will now be described in reference to FIG. 8. FIG. 8 discloses a mapping 800 of time division duplex configuration for a plurality of aggregated carrier components. In some embodiments timing of these component carriers may be aligned with each other. The mapping 800 information regarding the timing for sending and/or receiving data for a plurality of aggregated component carriers CC#0 (301), CC#1 (302), CC#2 (303), CC#3 (304). FIG. 8 discloses a frame split into a plurality of sub frames 802, 804, 805. In some embodiments the scheduling information may be for a time period other than a frame. For example, the scheduling information may be for a plurality of frames or alternatively a portion of a frame comprising a plurality of sub frames.

In some embodiments the scheduling information for each of the component carriers is generated by the processor 14. Alternatively in other embodiments the scheduling information is generated by a separate scheduler (not shown). The scheduler may be separate from the eNode B 12 or alternatively may be a modular component of the eNode B 12.

Once the processor 14 has obtained the timing of sending and receiving data for the component carriers 301, 302, 303, 304 the processor 14 then determines whether the timings of sending and receiving data for the aggregated component carriers 301, 302, 303, 304 are different as shown in step 404. In some embodiments the processor may compare the time division duplex configurations of a plurality of component carriers.

In this way, the processor 14 determines whether each sub frame for the different component carriers have a similar or different time division duplex configuration. The processor 14 may determine whether the timings for sending and receiving data for each of the component carriers in each sub frame vary between the respective carrier components 301, 302, 303, 304.

The time division duplex configuration for each component carrier may require the user equipment 1 to have different states. For example sub-frames 802, 804 and 806 require the user equipment 1 to have different states. Sub frame 802 is labeled "D" which corresponds to a downlink status. That is the user equipment 1 receives information from the eNode B 12 when the sub frame is in the downlink status. Sub-frame 804 is labeled "S" which corresponds to a special sub-frame status. The special sub-frame S corresponds to a sub-frame which contains a downlink part, guard time and an uplink part. The downlink part of the special sub-frame is reserved for downlink transmissions and the uplink part of the special sub-frame is reserved for uplink transmissions. The special sub-frame is described in Section 4.2 of 3GPP TS 36.211 v9.1.0. In some embodiments the special sub-frame 804 may be regarded as a downlink sub-frame. Sub-frame 806 is labeled "U" which corresponds to an uplink status. That is the user equipment sends data to the eNode B during an uplink sub frame.

The processor 14 determines whether the time division duplex configuration for two or more component carriers are different by comparing the sub-frame status. For example sub-frames 806, 808, 810 and 812 all correspond to sub-frames of different component carriers (301, 302, 303 and 304 respectively) which are part of the same carrier aggregation in the 5$^{th}$ sub-frame of a particular frame. Processor 14 determines that the time division duplex configuration for component carriers 302 and 301 is different from the time division duplex configuration for component carriers 303 and 304 in the time period for sub-frames 806, 808, 810 and 812.

Having determined that the time division duplex configuration for two of the component carriers is different, the processor 14 sets time division duplex configuration for the component carriers as shown in step 406. FIG. 5 shows the step of configuring the component carriers in step 504. The processor 14 carries out radio resource control (RRC) level configuration of uplink (UL) and/or downlink (DL) component carrier (CC) set. In some embodiments, the RRC level configuration of the CC set is based on uplink and downlink data transmission needs and whether CC aggregation is possible. It is up to the eNode B 12 how many component carriers are configured after a successful RACE procedure.

In some embodiments the processor maintains the time division duplex configuration of a first component carrier. In some embodiments the first component carrier is an anchor carrier or primary component carrier which receives and transmits control information related to the component carriers (301, 302, 303, 304 and 305). In some embodiments the control information is acknowledgements, negative acknowledgements and/or scheduling grants, all of which are transmitted and received by the anchor carrier.

The processor 14 sets the time division duplex configuration on component carriers having a different time division duplex configuration from the anchor carrier. In some embodiments the processor 14 sets the time division duplex configuration by preventing carriers other than the anchor carrier transmitting or receiving when the anchor carrier is receiving or transmitting respectively in a particular time period. That is, the processor 14 stops the component carriers transmitting when the anchor carrier is receiving or the component carriers receiving when the anchor carrier is transmitting. Component carriers other than the anchor carrier may be referred to as secondary component carriers.

This can provide an arrangement where a user equipment is not required to simultaneously receive and transmit data and where the user equipment does not self interfere. Furthermore, by preventing component carriers having different time division duplex configurations to the anchor carrier, hybrid automatic repeat request timing can be arranged to be the same for all of the component carriers. Some embodiments can overcome the problem of applying hybrid automatic repeat request timing to different time division duplex configurations. Furthermore, by sending the control information such as acknowledgements and negative acknowledgements on the anchor carrier, it is possible too optimize user equipment power consumption for transmission of uplink acknowledgements and negative acknowledgements by sending all uplink acknowledgements and negative acknowledgements in one sub frame in one single carrier transmission.

Figure 5:
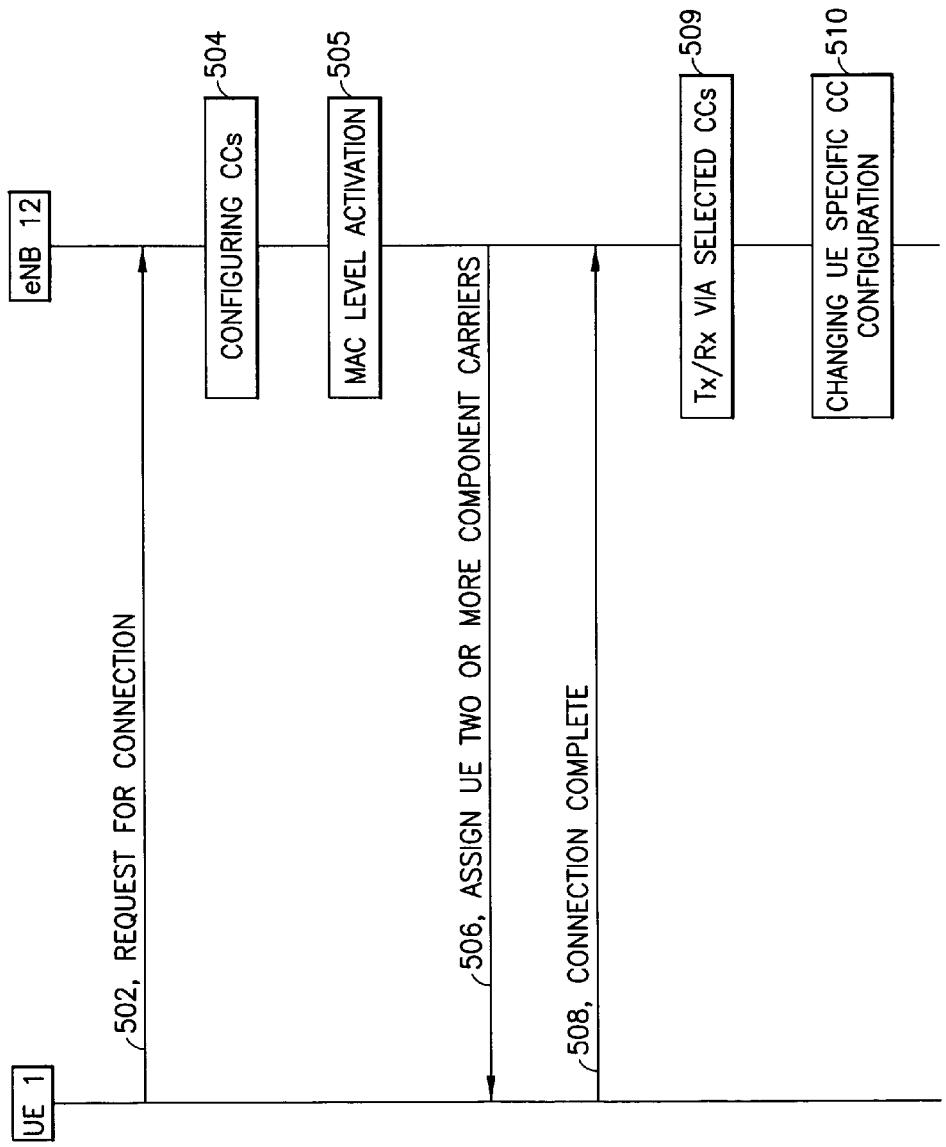
FIG. 5 shows a signalling diagram according to some embodiments.

After the processor 14 has configured the timing for sending and receiving data on the component carriers as shown in step 504 of FIG. 5, the processor 14 performs MAC level activation of the predetermined component carriers as shown in step 505. The MAC level activation of the predetermined component carriers means that data transmission is possible on the activated component carriers.

After the component carriers have been activated, the processor 14 assigns two or more component carriers to the user equipment as shown in step 506. The user equipment sends an acknowledgement back to the eNode B 12 as shown in step 508 to indicate that the connection is complete. In some embodiments, additionally or alternatively the determining whether the time division duplex configuration for at least two aggregated component carriers are different may be carried out after the user equipment is assigned to the component carriers.

The user equipment then transmits and receives data via the selected component carriers based on scheduling decisions carried out by the processor 14 at the eNode B 12 as shown in step 509.

In some alternative embodiments, the processor 14 may reschedule the timing of receiving and/or sending data for component carriers other than the anchor carrier to be the same as the anchor carrier if the processor 14 determines that the timings of aggregated component carriers are different.

Setting the timing of receiving and/or sending data for the at least two component carriers after assigning the carriers to the user equipment is shown in step 510. That is, the configuration of the user equipment specific component carrier configuration is changed in step 510. For example, the number of uplink and/or downlink carrier components may be increased or decreased.

Figure 6:
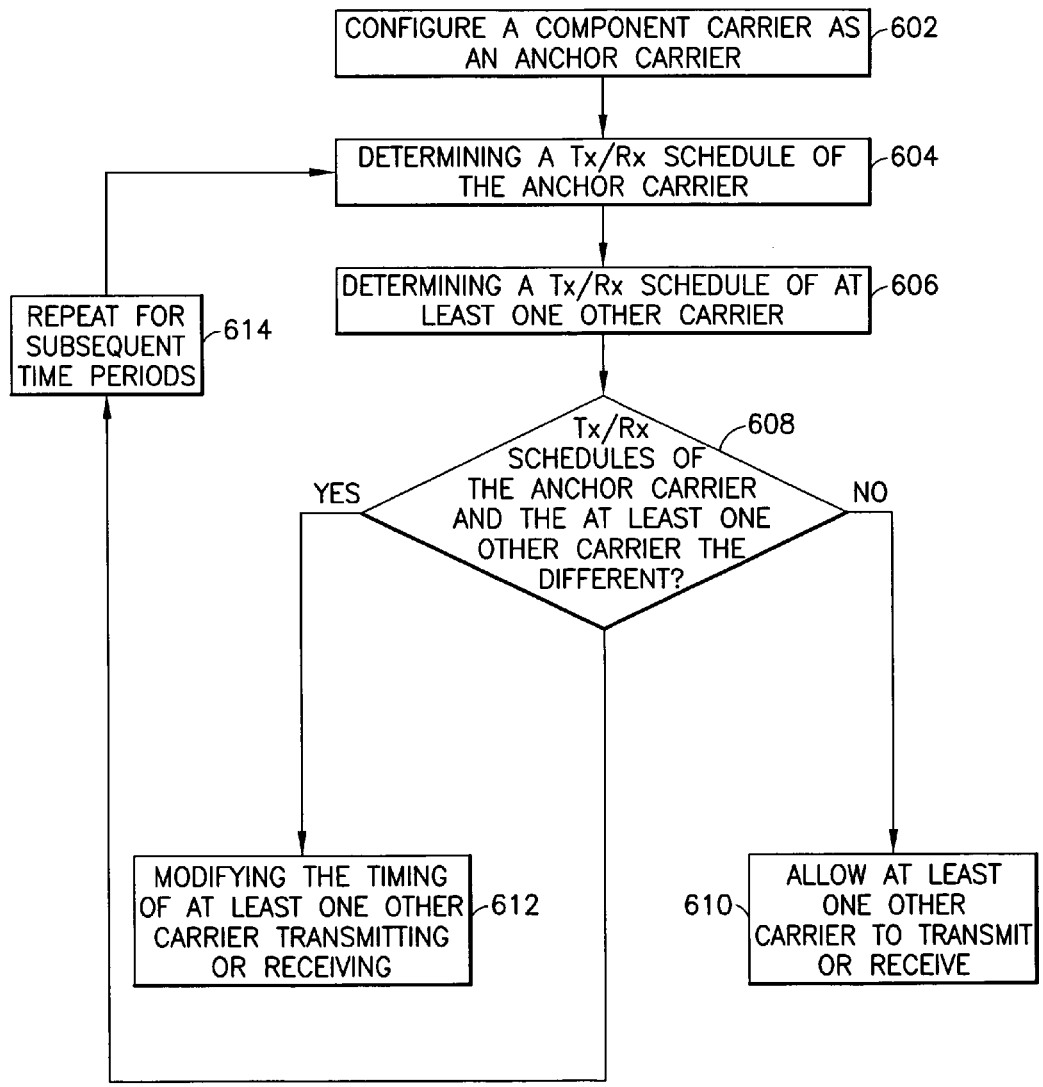
FIGS. 6 and 7 show other flow diagrams according to some further embodiments.

FIG. 6 shows a schematic flow diagram according to some further embodiments.

Figure 9:
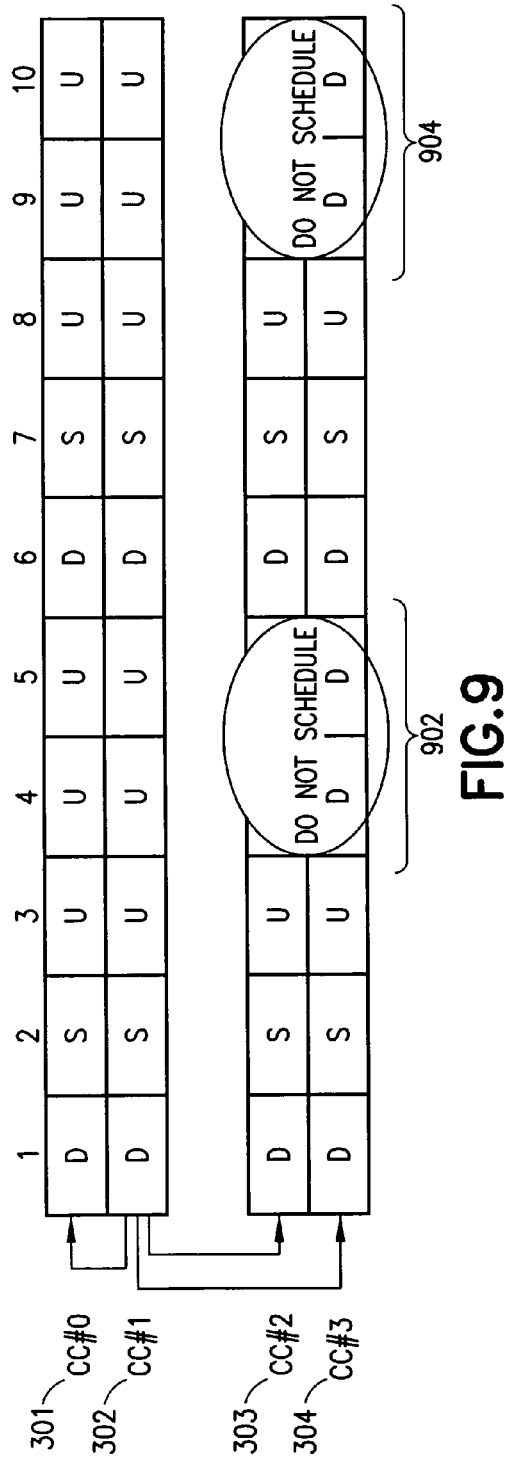

The processor 14 configures one component carrier as an anchor carrier as shown in step 602. As mentioned previously the anchor carrier transmits and receives all the related acknowledgements and/or negative acknowledgements for both the uplink and downlink. FIG. 9 discloses a time division duplex configuration of carriers according to some embodiments. In particular component carrier #1, 302, is configured by the processor 14 to be the anchor carrier. In this case, the hybrid automatic repeat request timing is aligned with the time division duplex configuration of the anchor carrier 302.

Once the processor 14 configures the anchor carrier 302, the processor determines the time division duplex configuration on the anchor carrier 302 as shown in step 604. The processor 14 then determines the time division duplex configuration of the other component carriers 301, 303 and 304 as shown in step 606. In some embodiments some of the component carriers may be contiguous carriers and have a similar time division duplex configuration. For example, component carriers 301 and 302 are contiguous carriers and have a similar time division duplex configuration.

The processor 14 then determines whether the time division duplex configuration of the anchor or primary carrier is different from the time division duplex configuration on the other or secondary carriers as shown in step 608.

If the time division duplex configuration of the component carrier 301 is the same as the anchor carrier 302 then the processor 14 sets the scheduling of the component carrier 301 by maintaining the previous time division duplex configuration of the component carrier 301 as shown in step 610.

If the processor 14 determines that the time dime division duplex configuration of other component carriers 303 and 304 are different from time division duplex configuration the anchor carrier 302, the processor 14 proceeds to set the scheduling of the component carriers with different time division duplex configurations. That is, the processor 14 modifies the scheduling of the component carriers such that the timing of sending and receiving data on the other component carriers 303, 304 is aligned to that of the transmission type on the anchor carrier 302. The step of modifying the time division duplex configuration of the other carriers 303, 304 is shown in step 612.

The processor 14 in some embodiments may modify the scheduling of the other carriers 303 and 304 by preventing the carriers 303, 304 from scheduling sending or receiving data in the portion of the time division duplex configuration which conflicts with the time division duplex configuration of the anchor carrier 302. For example, FIG. 9 discloses a time division duplex configuration for component carriers 303 and 304 which differ from the time division duplex configuration of the anchor carrier 302 in the $4^{th}$, $5^{th}$, $9^{th}$ and $10^{th}$ sub-frames. In this way, the processor 14 determines that the $4^{th}$, $5^{th}$, $9^{th}$, and $10^{th}$ sub-frames conflict and therefore component carriers 303, 304 cannot be scheduled to transmit or receive data in these sub frames because this will lead to self interference of the user equipment 1.

In some embodiments the user equipment 1 may receive an incorrect scheduling grant. For example, the user equipment 1 may receive a time division duplex configuration from the processor 14 whereby the time division duplex configuration requires the user equipment 1 to schedule transmission of data in time slots which are subject to scheduling restrictions. If the user equipment 1 receives a scheduling decision which causes concurrent transmission and reception, the user equipment 1 follows the time division duplex configuration of the anchor carrier component. The user equipment 1 will ignore the scheduling grant corresponding to secondary component carriers.

The processor 14 sets the timing of sending and receiving data for carriers 303 and 304 such that no transmission or reception of data is carried out on carriers 303 or 304 for the time periods 902, 904. In this way there is no conflict with the time division duplex configuration of the anchor carrier 302 with the time division duplex configuration of another component carrier. In some alternative embodiments, the processor 14 modifies the scheduling of carriers 303 and 304 such that the scheduling of the component carriers in the $4^{th}$, $5^{th}$, $9^{th}$ and $10^{th}$ sub-frames is aligned with the anchor carrier 302.

Figure 10:
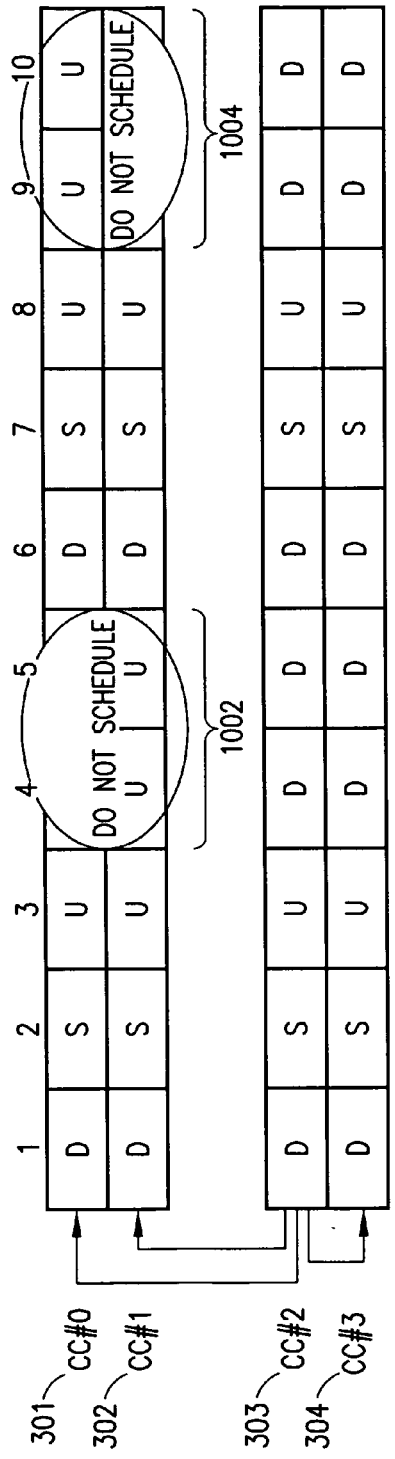

FIG. 10 illustrates an alternative time division duplex configuration whereby the component carrier 303 is config-ured to be the anchor carrier as shown in step 602. In this way, FIG. 10 is identical to FIG. 9 except that the anchor carrier is a different carrier component. Processor 14 determines in step 608 that the $4^{th}$, $5^{th}$, $9^{th}$, and $10^{th}$ sub-frames of component carriers 301 and 302 are different from the anchor carrier 303 and therefore processor 14 modifies the scheduling in these sub frames in step 614 as previously mentioned.

In some embodiments the configuration of the anchor carrier may be modified periodically. For example, the anchor carrier may be a different component carrier in separate time periods. Additionally or alternatively there may be one or more anchor carrier components.

In some embodiments physical downlink shared channel (PDSCH) and physical downlink control channel (PUSCH) scheduling on the non-anchor or secondary component carrier may be made by cross-carrier scheduling mean. That is, a scheduling grant (PDCCH) is signaled via the anchor component carrier. The scheduling grant comprises a carrier indicator field (CIF). The CIF comprises information regarding the destination component carrier for PDSCH or PUSCH. Furthermore, hybrid automatic repeat request (HARQ) FB is transmitted via the uplink and the downlink anchor component carriers.

The method as shown in FIG. 6 may be determined in some embodiments for subsequent time periods as shown in step 614. For example the method may be carried out each frame to check that the eNodeB 12 has not erroneously scheduled sub-frames which cause the user equipment 1 to transmit and receive on different component carriers at the same time.

Figure 7:
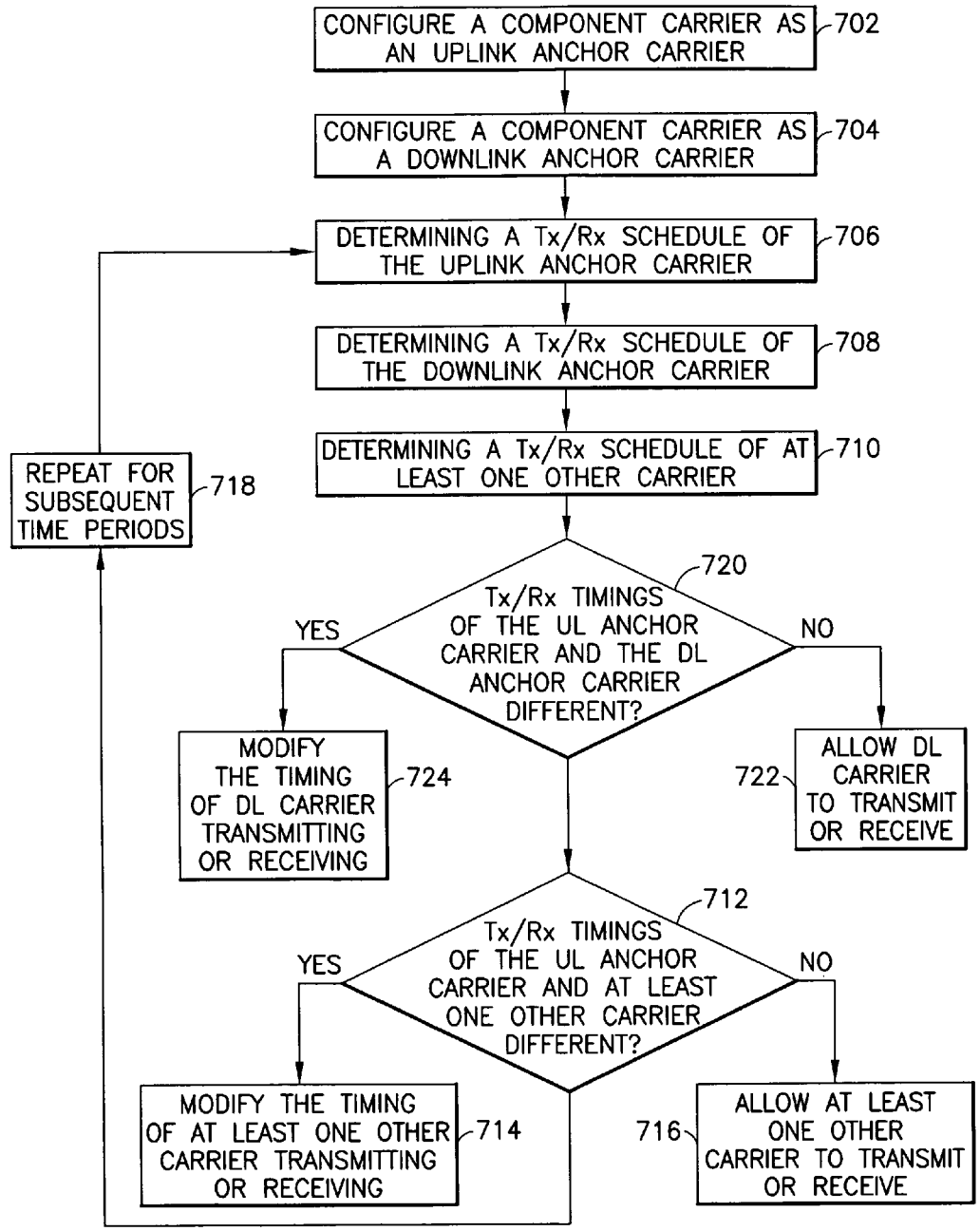
Figure 11:
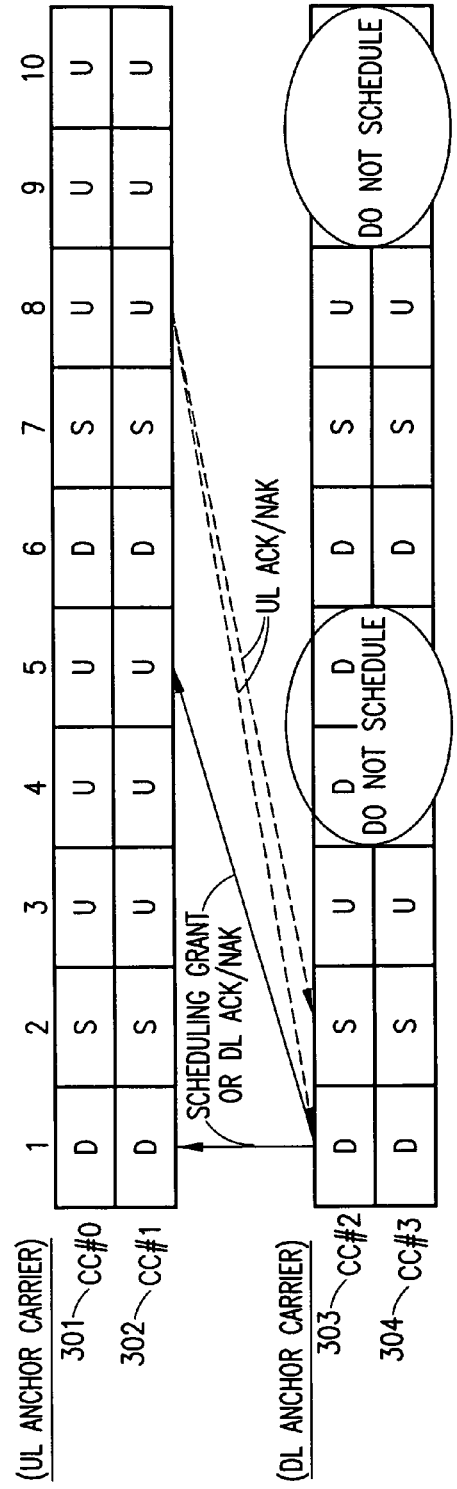

FIG. 7 illustrates a schematic flow diagram according to some other embodiments. The processor 14 configures a first carrier as an uplink anchor carrier as shown in step 702. The uplink anchor carrier transmits all the related uplink acknowledgements and negative acknowledgements. FIG. 11 shows a time division duplex configuration for a plurality of aggregated carrier components wherein the carrier component #1, 302, is the uplink anchor carrier.

After the processor has configured an uplink anchor carrier 302, the processor configures another carrier as a downlink anchor carrier as shown in step 704. The downlink anchor carrier transmits all the related downlink acknowledgements and negative acknowledgements and scheduling grants. FIG. 11 shows component carrier #2, 303, is configured as the downlink anchor carrier.

In some embodiments only one downlink anchor carrier and one uplink anchor carrier are selected. In other embodiments there may be additional anchor carriers.

The processor then determines the time division duplex configuration on the uplink anchor carrier 302 as shown in step 706. The processor also determines the time division duplex configuration on the downlink anchor carrier 303 as shown in step 708. The processor also determines time division duplex configuration on other component carriers 301 and 304 as shown in step 710, The steps of determining the time division duplex configurations on the carriers is similar to the steps in 604 and 606 of FIG. 6.

Indeed FIG. 7 is similar to FIG. 6 except that there is an additional anchor carrier and there is an additional step of determining the difference between the uplink anchor carrier and the downlink anchor carrier. The steps 712, 714, 716 and 718 are the same as the steps 608, 610, 612 and 614 in FIG. 6 and will not be discussed in any further detail.

After the time division duplex configuration of other carriers 301 304 has been determined as shown in step 710, the processor determines whether time division duplex configuration of the uplink anchor carrier 302 is different from the time division duplex configuration on the downlink anchor carrier 303 as shown in step 720.

If the time division duplex configuration of the uplink anchor carrier 302 is the same as the time division duplex configuration of the downlink anchor carrier 303, the processor 14 allows the downlink carrier to maintain the same time division duplex configuration as shown in step 722 which is similar to step 610 in FIG. 6.

If the time division duplex configuration of the uplink anchor carrier 302 is different from the time division duplex configuration of the downlink anchor carrier 303 the processor 14 modifies the scheduling of the downlink carrier, which is similar to the process discussed in step 612 of FIG. 6.

The processor 14 in some embodiments determines whether the eNode B makes illegal scheduling. If the processor 14 determines that the eNode B schedules subframes which conflict with the anchor carrier 302, 303, the processor 14 ignores the downlink/uplink grants and does not schedule sending or receiving data in the time period for which the eNode B has made illegal scheduling.

The arrows in FIG. 11 represent timing between uplink and downlink data transmission and corresponding ACK/NACK.

In some embodiments the processor 14 only allows scheduling of one type of transmission during one sub frame. That is, the processor 14 only allows transmission on the downlink anchor carrier or transmission on the uplink anchor carrier during any one sub frame. In this way, the processor 14 may apply scheduling restrictions to carrier components having different uplink or downlink configurations compared to one or more anchor carriers.

In some other embodiments there may be an asymmetric carrier component aggregation for at least one user equipment. For example, in some embodiments the number of uplink carrier components assigned to a user equipment may be greater than the number of downlink carrier components assigned to a user equipment. Alternatively in some other embodiments, the number of downlink carrier components assigned to a user equipment may be greater than the number of uplink carrier components assigned to a user equipment.

It is noted that whilst embodiments have been described in relation to LTE-Advanced, similar principles can be applied to any other communication system where a carrier comprising a multiple of component carriers is employed. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention. For example there are some additional embodiments arising from the combination of one or more features from one or more aforementioned embodiments.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Some embodiments may be implemented with circuitry. As an example, as used in this application, the circuitry may comprise an implementation of merely a processor (or multiple processors) or portion of a processor and its (or their) accompanying software and/or firmware. The circuitry may also comprise, for example, and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. A method comprising:
   determining how timings of at least one of receiving and sending data for at least two aggregated component carriers of a time division duplex system in at least one sub frame time period are related, wherein the determining comprises comparing a time division duplex configuration of the at least two aggregated component carriers; and
   setting the timings of at least one of receiving and sending data for the at least two aggregated component carriers based on the determining.

2. A method according to claim 1 wherein the setting comprises preventing at least one of receiving and sending data on one of the at least two aggregated component carriers in the at least one sub frame time period if the timings are different.

3. A method according to claim 1 wherein the setting comprises allowing at least one of receiving and sending data on one of the at least two aggregated component carriers in the at least one sub frame time period if the timings are the same.

4. A method according to claim 1 wherein the at least two aggregated component carriers comprises at least one first component carrier for at least one of receiving and sending control information.

5. A method according to claim 4 wherein the setting comprises preventing at least one of receiving and sending data in the at least one sub frame time period on at least one second component carrier if the timings of at least one of receiving and sending data of the at least one second component carrier is different from the timings of at least one of receiving and sending data of the at least one first component carrier.

6. A method according to claim 4 wherein the control information comprises one or more of: acknowledgements, negative acknowledgements, and scheduling grants.

7. A method according to claim 1 wherein the at least two aggregated component carriers comprises a plurality of contiguous or non contiguous component carriers.

8. A method according to claim 4 wherein at least one of hybrid automatic repeat request timing and uplink resource allocation timing is based on timings of the at least one first component carrier.

9. A method according to claim 4 wherein the at least one first component carrier comprises at least one downlink carrier and at least one uplink carrier.

10. A method according to claim 9 wherein downlink control information is at least one of received and sent on the at least one downlink carrier and uplink control information is at least one of received and sent on the at least one uplink carrier.

11. A method according to claim 9 wherein the setting comprises scheduling sending information only on the at least one uplink carrier or on the at least one downlink carrier in the at least one sub frame time period.

12. A method according to claim 9 wherein a number of downlink carriers is different from a number of uplink carriers.

13. A method according to claim 1 wherein the at least one sub frame time period comprises one or more sub frames, wherein comparing the time division duplex configuration of the at least two aggregated component carriers comprises comparing a sub frame status of the at least two aggregated component carriers in the at least one sub frame time period, wherein a sub frame status of a component carrier is one of a downlink status, an uplink status, and a special sub frame status.

14. A method according to claim 1 wherein the at least one of receiving and sending data occurs on the same carrier.

15. A non-transitory computer readable medium storing a computer program comprising program code, the program code executed by at least one processor to perform the method of claim 1 when the program is run on a data processing apparatus.

16. An apparatus comprising:
   a processor;
   memory including computer program code;
   the memory and the computer program code configured to, with the processor, cause the apparatus to at least:
      determine how timings of at least one of receiving and sending data for at least two aggregated component carriers of a time division duplex system in at least one sub frame time period are related, wherein the determining comprises comparing a time division duplex configuration of the at least two aggregated component carriers; and
      set the timings of at least one of receiving and sending data for the at least two aggregated component carriers on a basis of the determining.

17. An apparatus according to claim 16 wherein the setting comprises at least one of preventing receiving and sending data on one of the at least two aggregated component carriers in the at least one sub frame time period if the timings are different.

18. An apparatus according to claim 16 wherein the setting comprises allowing at least one of receiving and sending data on one of the at least two aggregated component carriers in the at least one sub frame time period if the timings are the same.

19. An apparatus according to claim 16 wherein the at least two aggregated component carriers comprises at least one first component carrier for at least one of receiving and sending control information.

20. An apparatus according to claim 19 wherein the setting comprises preventing at least one of receiving and sending data in the at least one sub frame time period on at least one second component carrier if the timings of at least one of receiving and sending data of the at least one second component carrier is different from the timings of at least one of receiving and sending data of the at least one first component carrier.

21. An apparatus according to claim 19 wherein the control information comprises one or more of: acknowledgements, negative acknowledgements, and scheduling grants.

22. An apparatus according to claim 16 wherein the at least two aggregated component carriers comprises a plurality of contiguous or non contiguous component carriers.

23. An apparatus according to claim 19 wherein at least one of hybrid automatic repeat request timing and uplink resource allocation timing is based on the timings of the at least one first component carrier.

24. An apparatus according to claim 19 wherein the at least one first component carrier comprises at least one downlink carrier and at least one uplink carrier.

25. An apparatus according to 24 wherein downlink control information is at least one of received and sent on the at least one downlink carrier and uplink control information is at least one of received and sent on the at least one uplink carrier.

26. An apparatus according to claim 24 wherein the setting comprises scheduling sending information only on the at least one uplink carrier or on the at least one downlink carrier in the at least one sub frame time period.

27. An apparatus according to claim 26 wherein a number of downlink carriers is different from the number of uplink carriers.

28. An apparatus according to claim 16 wherein the at least one sub frame time period is one or more sub frames, wherein comparing the time division duplex configuration of the at least two aggregated component carriers comprises comparing a sub frame status of the at least two aggregated component carriers in the at least one sub frame time period, wherein a sub frame status of a component carrier is one of a downlink status, an uplink status, and a special sub frame status.

29. An apparatus according to claim 16 wherein the at least one of receiving and sending data occurs on the same carrier.

\* \* \* \* \*